US008425091B2

(12) United States Patent
Chen

(10) Patent No.: US 8,425,091 B2
(45) Date of Patent: Apr. 23, 2013

(54) DIVIDED LED LAMP

(75) Inventor: Jiaqiang Chen, Guangzhou (CN)

(73) Assignee: Guangzhou Yajiang Photoelectric Equipment Co., Ltd., Guangdong (CN)

( * ) Notice: Subject to any disclaimer, the term of this patent is extended or adjusted under 35 U.S.C. 154(b) by 266 days.

(21) Appl. No.: 12/866,741

(22) PCT Filed: May 8, 2009

(86) PCT No.: PCT/CN2009/000502
§ 371 (c)(1), (2), (4) Date: Aug. 9, 2010

(87) PCT Pub. No.: WO2009/146599
PCT Pub. Date: Dec. 10, 2009

(65) Prior Publication Data

US 2010/0315824 A1 Dec. 16, 2010

(30) Foreign Application Priority Data

Jun. 6, 2008 (CN) .......................... 2008 1 0028653

(51) Int. Cl.
*B60Q 1/06* (2006.01)

(52) U.S. Cl.
USPC .......................................... 362/373; 362/294

(58) Field of Classification Search .................. 362/373, 362/227, 249.02; 313/46, 500, 512; 257/81, 257/99
See application file for complete search history.

(56) References Cited

FOREIGN PATENT DOCUMENTS

| | | |
|---|---|---|
| CN | 101329015 | * 12/2008 |
| CN | 201212629 | * 3/2009 |

* cited by examiner

*Primary Examiner* — Mary Ellen Bowman
(74) *Attorney, Agent, or Firm* — Leong C. Lei

(57) ABSTRACT

A divided LED lamp includes an LED assembly, a casing assembly, LED electronics, power and signal cables, a control panel including a display screen and operation buttons, and a bracket for mounting the lamp. The casing assembly includes a first casing member and a second casing member. At least one cable tube is formed between the first casing member and the second casing member. The power and signal cables that connect the LED assembly received in the first casing member and the LED electronics received in the second casing member are received through the cable tube. This arrangement allows the LED assembly and the LED electronics to be received in individual and independent casing members and are associated with respective individual heat dissipation fins or heat radiators, so as to realize high efficiency of heat dissipation, stabilized operation, and extended lifespan.

8 Claims, 3 Drawing Sheets

DIVIDED LED LAMP

TECHNICAL FIELD OF THE INVENTION

The present invention generally relates to the field of electrical lighting, and more particularly to an LED (Light-Emitting Diode) lamp and especially a divided LED lamp of which heat dissipations for LED assemblies and LED electronics are performed separately.

DESCRIPTION OF THE PRIOR ART

With the continuous development of LED (Light-Emitting Diode) technology LED lamps are now widely used in the field of lighting, especially for outdoor lighting, including commercial zones, high buildings, and landscape sites of cities, which use LED lamps for lighting purposes in night-times, site lighting, and color lighting. The outdoor LED lighting faces two major challenges, of which one is heat dissipation and the second is water resistance. Intense sun light and rainwater occurring in an outdoor environment set direct influences on the performance of an LED lamp and more particularly, the lifespan of the lamp is also affected. Solutions for the problems of heat dissipation and water resistance are vital issues for the research and development of the manufacturers of LED lamp. In respect of heat dissipation, two major concerns are worked on, of which one is dissipation of heat for an LED assembly, and the second is dissipation of heat for LED electronics. For the state-of-art technology, it is often that the LED assembly and the LED electronics share a common heat radiator. In other words, the LED assembly and the LED electronics are mounted in the same casing and they use the same set of heat dissipation fins or a common heat dissipation fan. This arrangement of heat dissipation often leads to combination of the heats generated by the LED assembly and the LED electronics, eventually resulting in overloading of the heat radiator, making it not possible to achieve the desired performance of heat dissipation. Further, the LED assembly, which requires a great amount of heat to be removed may transfer excessive heat generated thereby through the heat radiator to the LED electronics, making the temperature of the LED electronics raised and eventually deteriorating operation stability of the LED electronics and shortening the lifespan of the LED electronics.

SUMMARY OF THE INVENTION

To overcome the above discussed problems, the present invention provides a divided LED lamp, which allows LED assemblies and LED electronics to be received in individual and independent casing members and associated with respective heat dissipation fins or heat radiator, so as to realize high efficiency of heat dissipation, stabilized operation, and extended lifespan.

Another objective of the present invention is to provide a divided LED lamp, which effectively overcomes cable connection and water-tightness problem caused by separately arranging LED assemblies and LED electronics in individual and independent casing members and provides a safe and reliable structure, which particularly shows enhanced performance of water resistance and heat dissipation for outdoor facility.

To achieve the above objectives, the present invention provides a divided LED lamp, which comprises an LED assembly, a casing assembly, LED electronics, power and signal cables, a control panel comprising a display screen and operation buttons, and a bracket for mounting the LED lamp. The casing assembly comprises a first casing member and a second casing member. The first casing member comprises a front panel and a first rear shell. The LED assembly is mounted to an inside surface of the first rear shell. The first rear shell has an outside surface forming heat dissipation fins. The first rear shell and the heat dissipation fins are metal parts integrally formed together. A heat radiator is tightly positioned against a rear side of the first rear shell. The second casing member comprises a front shell and a second rear shell. The LED electronics are mounted on an inside surface of the front shell. The front shell has an outside surface forming heat dissipation fins. The front shell and the heat dissipation fins are metal parts integrally formed together. The second casing member is mounted rearward of the heat radiator and forms a gap with the heat radiator. At least one cable tube is formed between the first casing member and the second casing member with the power and signal cables that connect the LED assembly received in the first casing member and the LED electronics received in the second casing member is received through the cable tube. The heat radiator forms at least one cable tube mounting hole. The cable tube is received and retained in the cable tube mounting hole.

In an embodiment of the present invention, the cable tube is a hollow tubular member having an external thread. The first rear shell and the front shell form mounting holes that have inner threads for mating and accommodating the cable tube. The cable tube is provided with nuts that mate the cable tube at portions of the cable tube located inside the first casing member and the second casing member.

As an modification of the present invention, the first rear shell of the first casing member and the front shell of the second casing member are provided with positioning posts that protrude outwards and the positioning posts form bolt mounting holes facing inward the casing members.

As a further modification of the present invention, the LED assembly and the LED electronics form mounting portions that correspond respectively to the bolt mounting holes of the positioning posts that face inward the casings. The LED assembly is positioned tightly against the inside surface of the first rear shell and fixed to the inside surface of the first rear shell. The LED electronics being positioned tightly against the inside surface of the front shell and fixed to the inside surface of the front shell.

In an embodiment of the present invention, the heat radiator comprises an aluminum alloy board having a surface forming grating like heat dissipation fins and an opposite surface forming recesses that mate the positioning posts protruding outward from the first rear shell.

As a modification of the present invention, the heat radiator forms a sealing ring slot around the cable tube mounting hole and the sealing ring slot receives therein a sealing ring.

As a further modification of the present invention, the cable tube mounting hole of the heat radiator forms an inner thread that mates the external thread of the cable tube.

As a modification of the present invention, the first casing member is provided, at opposite ends thereof, with connection devices, each of which comprises a connection screw mounted to one end of the first casing member and a hand wheel mounted to an end of the connection screw and an engagement notch formed in an opposite end of the first casing member and engageable with the connection screw.

As compared to the existing technology the present invention provides a divided LED lamp, which allows LED assembly and LED electronics to be accommodated in individual and independent casing members so as to effectively overcome heat dissipation problems of the LED assembly and the LED electronics. The present invent also overcomes the problems of cable connection of the LED assembly and water-tightness of the casing caused by the divided arrangement. The present invention provides the following advantages:

(1) Since the LED assembly and the LED electronics are respectively received in independent casings, the LED assembly and the LED electronics do not interfere with each other for heat dissipation and easy maintenance can also be realized.

(2) Since the cable tube arranged between the first casing member and the second casing member is associated with the cable tube mounting hole and the sealing ring formed in the heat radiator, an arrangement that overcomes the problem of water-tightness occurring in a divided structure is realized and three-layered water-tightness is achieved to ensure protection of the cables received through the cable tube and also ensure water-resistant performance of the casings.

(3) Since the LED assembly and the LED electronics are positioned tightly against inside surfaces of the casing members, the heat generated can be directly transferred through the metal casing members to the heat dissipation fins located outside the casing members to be dissipated away by the heat dissipation fins or heat radiators.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
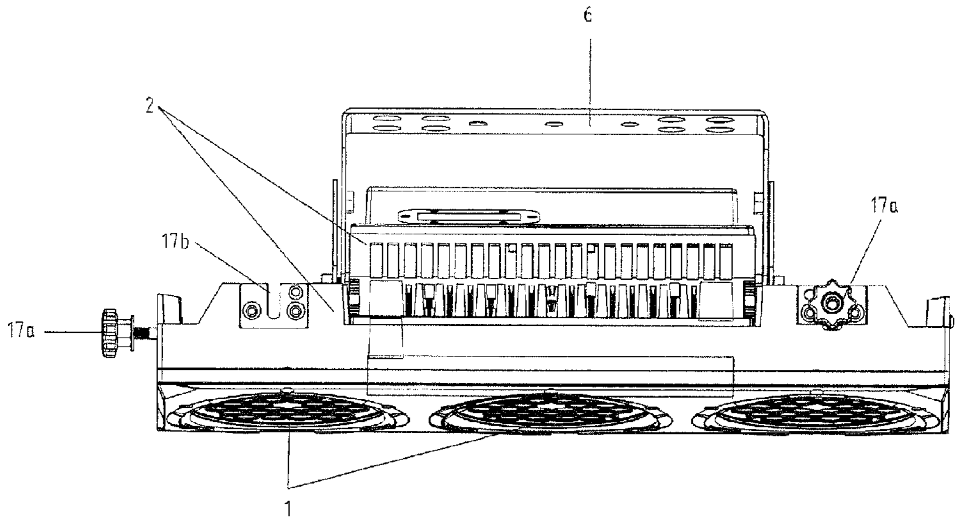
FIG. 1 is a perspective view of a divided LED lamp according to the present invention in an assembled form.

As shown in FIG. 1, the present invention provides a divided LED lamp, which comprises LED assemblies 1, a casing assembly 2, LED electronics 3, power and signal cables 4, a control panel 5 comprising a display screen and operation buttons, and a bracket 6 for mounting the LED lamp.

As shown in FIGS. 1-4, the casing assembly 2 is composed of a first casing member 7 and a second casing member 8. The first casing member 7 is composed of a front panel 7*a* and a first rear shell 7*b*. The LED assemblies 1 are mounted to an inside surface of the first rear shell 7*b*. An outside surface of the first rear shell 7*b* forms heat dissipation fins 9. The first rear shell 7*b* and the heat dissipation fins 9 are metal parts that are integrally formed together. A heat radiator 10 is tightly positioned against a rear side of the first rear shell 7*b*. The second casing member 8 is composed of a front shell 8*a* and a second rear shell 8*b*. The LED electronics 3 are mounted on an inside surface of the front shell 8*a*. An outside surface of the front shell 8*a* forms heat dissipation fins 9. The front shell 8*a* and the heat dissipation fins 9 are metal parts that are integrally formed together. The second casing member 8 is mounted rearward of the heat radiator 10 and forms a gap with the heat radiator 10. Four cable tubes 11 are formed between the first casing member 7 and the second casing member 8 and power and signal cables that connect the LED assemblies 1 received in the first casing member 7 and the LED electronics 3 received in the second casing member 8 are received through the cable tubes 11. The heat radiator 10 forms four cable tube mounting holes 12, which form inner threads that respectively mate external threads formed on the cable tubes 11. The cable tubes 11 are respectively received and retained in the cable tube mounting holes 12. The cable tubes 11 are hollow tubular members having external threads. The first rear shell 7*b* and the front shell 8*a* both form mounting holes that have inner threads for accommodating the cable tubes. The cable tubes are provided with mated nuts 15 at the portions thereof located inside the first casing member 7 and the second casing member 8, whereby the nuts 15 securely fix the cable tubes 11. The heat radiator 10 forms sealing ring slots 13 around the cable tube mounting holes 12 respectively and the sealing ring slots 13 receive therein sealing rings 14 respectively. With such an arrangement, the LED assemblies 1 and the LED electronics 3 are respectively received in independent casings, whereby the LED assemblies 1 and the LED electronics 3 do not interfere with each other for heat dissipation. Further, due to the arrangement of the cable tubes 11, electrical connection of cables between the LED assemblies 1 and the LED electronics 3 is achieved. Further, due to the three-layered structure formed of the cable tubes 11, the cable tube mounting holes 12, and the sealing rings 14, three-layered water-proof effect is realized, which remarkably improves water-tightness of the LED lamp and thus enhances safety of use of the LED lamp and extends the service life thereof.

Figure 2:
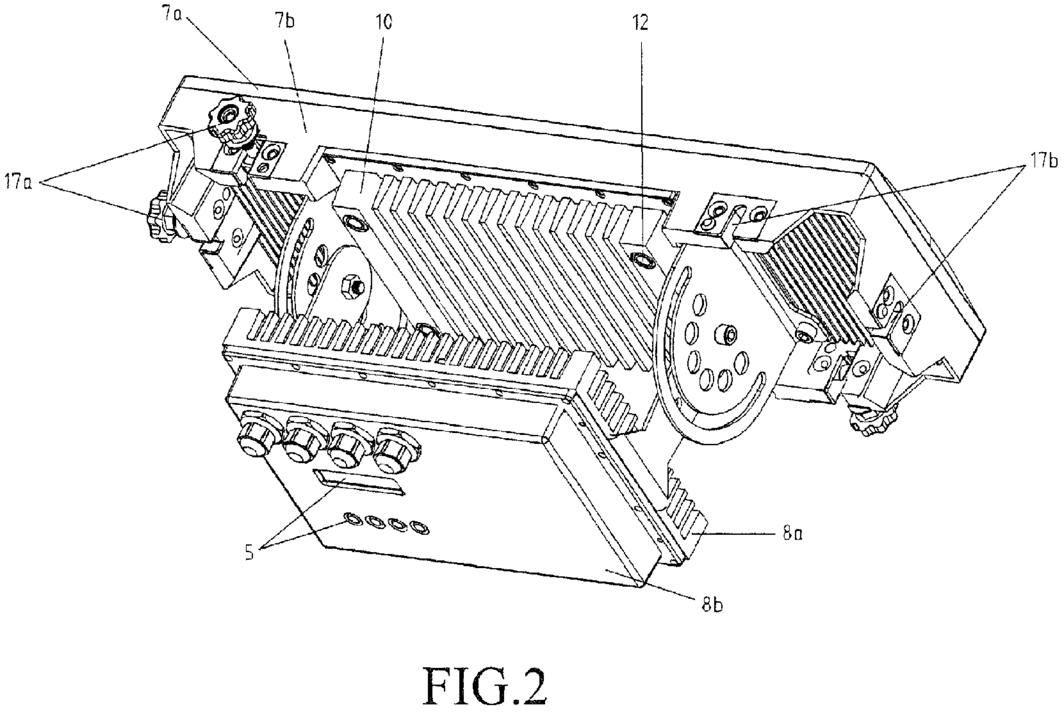
FIG. 2 is an exploded view of the divided LED lamp according to the present invention.
Figure 3:
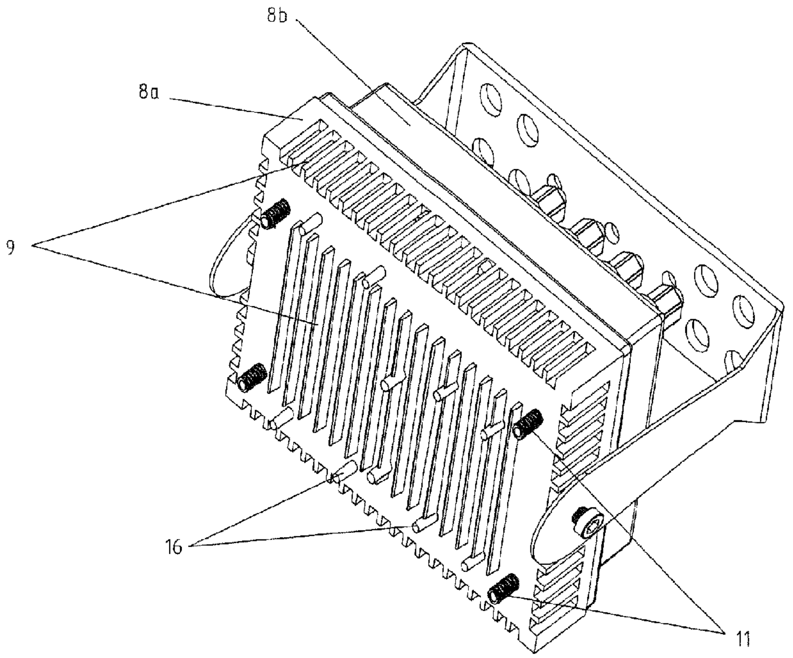
FIG. 3 is a perspective view of a second casing member of the divided LED lamp according to the present invention.
Figure 4:
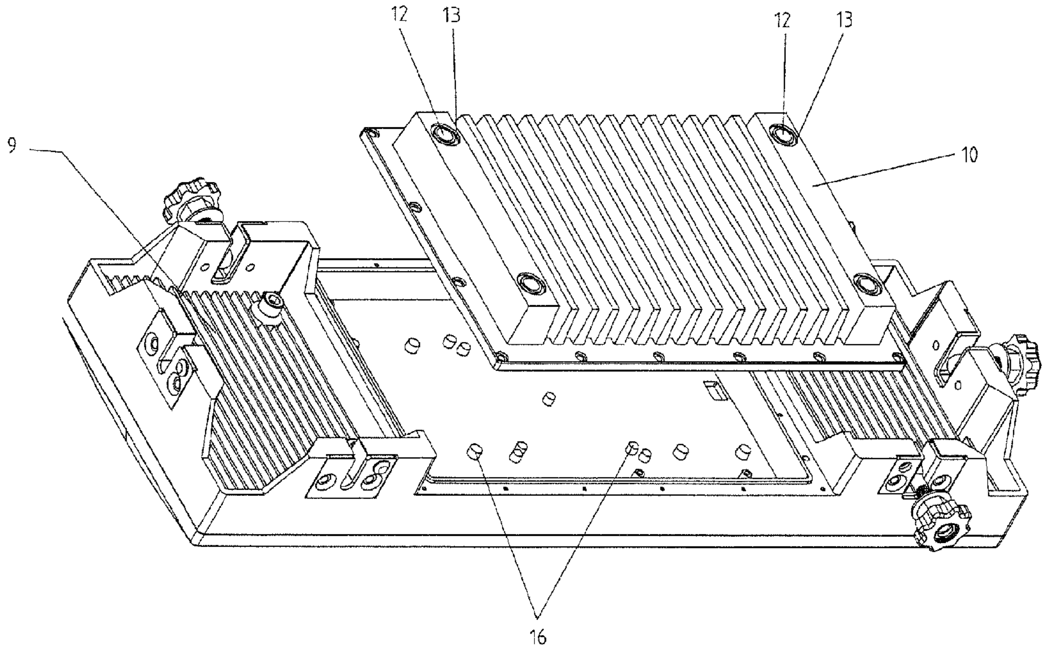
FIG. 4 is a perspective view of a first casing member of the divided LED lamp according to the present invention.
Figure 5:
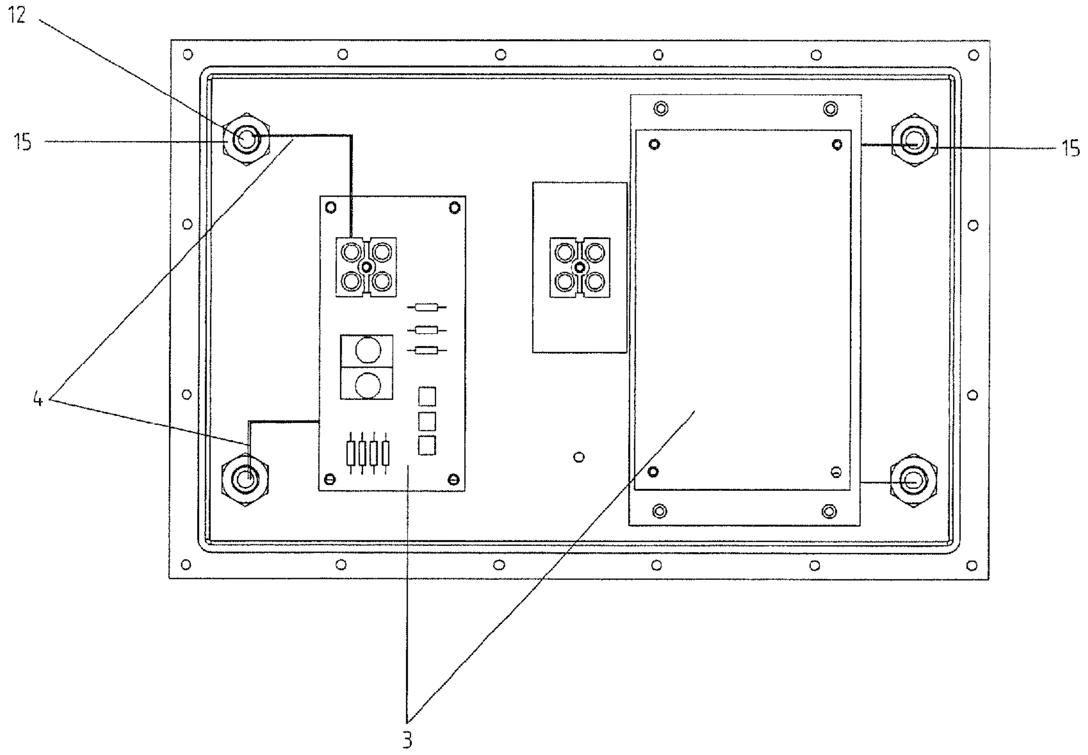
FIG. 5 is a schematic view of a heat radiator of the divided LED lamp according to the present invention.

As shown in FIGS. 2, 3, and 5, in the embodiment illustrated, the first rear shell 7*b* of the first casing member 7 and the front shell 8*a* of the second casing member 8 are both provided with positioning posts 16 that protrude outwards and the positioning posts 16 form bolt mounting holes facing inward the casings. The LED assemblies 1 and the LED electronics 3 both form mounting portions that correspond respectively to the bolt mounting holes of the positioning posts 16 that face inward the casings. The LED assemblies 1 are put tightly against the inside surface of the first rear shell 7*b* and fixed to the inside surface of the first rear shell 7*b*. The LED electronics 3 are put tightly against the inside surface of the front shell 8*a* and fixed to the inside surface of the front shell 8*a*. With such an arrangement, since the LED assemblies 1 and the LED electronics 3 are positioned tightly against the inside surfaces of the casings, the heat generated thereby can be directly transferred through the metal casings to the heat dissipation fins 9 formed on the outside surfaces of the casings to be dissipated away by the heat dissipation fins 9 and the heat radiator 10.

As shown in FIGS. 2 and 3, in the embodiment illustrated, the heat radiator 10 arranged on the first rear shell 7*b* of the first casing member 7 comprises for example an aluminum alloy board having a surface forming grating like heat dissipation fins 9 and an opposite surface forming recesses that mate the positioning posts 16 protruding outward from the first rear shell 7*b*. In such an arrangement, since the LED assemblies 1 requires dissipation of a larger amount of heat than the LED electronics 3, the arrangement of the heat radiator 10 can effectively remove heat from the LED assemblies 1, extending the lifespan of the LEDs.

As shown in FIGS. 1 and 2, in the embodiment illustrated, the first casing member 7 is provided, at opposite ends in the longitudinal direction and opposite ends in the lateral direction, with connection devices 17, each of which comprises a connection screw 17*a* mounted to one end of the first casing member 7 and a hand wheel mounted to an end of the connection screw and an engagement notch 17*b* formed in an opposite end of the first casing member 7 and engageable with the connection screw 17*a*. To connect, the connection screw 17*a* provided on one end of the first casing member 7 of one LED lamp is put into and engages the engagement notch 17*b* formed in an opposite end of the first casing member 7 and another LED lamp and then, manual rotation of the hand wheel is performed to secure the two LED lamps together. With such an arrangement, connection operation can be easily done to realize combination of multiple LED lamps.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A divided LED lamp, which comprises an LED assembly, a casing assembly, LED electronics, power and signal cables, a control panel comprising a display screen and operation buttons, and a bracket for mounting the LED lamp, wherein the casing assembly comprises a first casing member and a second casing member, the first casing member comprising a front panel and a first rear shell, the LED assembly being mounted to an inside surface of the first rear shell, the first rear shell having an outside surface forming heat dissipation fins, the first rear shell and the heat dissipation fins being metal parts integrally formed together, a heat radiator being tightly positioned against a rear side of the first rear shell, the second casing member comprising a front shell and a second rear shell, the LED electronics being mounted on an inside surface of the front shell, the front shell having an outside surface forming heat dissipation fins, the front shell and the heat dissipation fins being metal parts integrally formed together, the second casing member being mounted rearward of the heat radiator and forming a gap with the heat radiator, at least one cable tube being formed between the first casing member and the second casing member with the power and signal cables that connect the LED assembly received in the first casing member and the LED electronics received in the second casing member received through the cable tube, the heat radiator forming at least one cable tube mounting hole, the cable tube being received and retained in the cable tube mounting hole.

2. The divided LED lamp according to claim 1, wherein the cable tube is a hollow tubular member having an external thread, the first rear shell and the front shell forming mounting holes that have inner threads for mating and accommodating the cable tube, the cable tube being provided with nuts that mate the cable tube at portions of the cable tube located inside the first casing member and the second casing member.

3. The divided LED lamp according to claim 1, wherein the first rear shell of the first casing member and the front shell of the second casing member are provided with positioning posts that protrude outwards and the positioning posts form bolt mounting holes facing inward the casing members.

4. The divided LED lamp according to claim 3, wherein the LED assembly and the LED electronics form mounting portions that correspond respectively to the bolt mounting holes of the positioning posts that face inward the casings, the LED assembly being positioned tightly against the inside surface of the first rear shell and fixed to the inside surface of the first rear shell, the LED electronics being positioned tightly against the inside surface of the front shell and fixed to the inside surface of the front shell.

5. The divided LED lamp according to claim 1, wherein the heat radiator comprises an aluminum alloy board having a surface forming grating like heat dissipation fins and an opposite surface forming recesses that mate the positioning posts protruding outward from the first rear shell.

6. The divided LED lamp according to claim 5, wherein the heat radiator forms a sealing ring slot around the cable tube mounting hole and the sealing ring slot receives therein a sealing ring.

7. The divided LED lamp according to claim 6, wherein the cable tube mounting hole of the heat radiator forms an inner thread that mates the external thread of the cable tube.

8. The divided LED lamp according to claim 1, wherein the first casing member is provided, at opposite ends thereof, with connection devices, each of which comprises a connection screw mounted to one end of the first casing member and a hand wheel mounted to an end of the connection screw and an engagement notch formed in an opposite end of the first casing member and engageable with the connection screw.

* * * * *